US00RE37719E

(19) United States
(12) Reissued Patent
Sugiyama et al.

(10) Patent Number: US RE37,719 E
(45) Date of Reissued Patent: May 28, 2002

(54) OPTICAL DATA RECORDING SYSTEM AND METHOD OF PRODUCTION OF RECORDING MEDIUM

(76) Inventors: Toshinori Sugiyama, 1296-1, Tanaka, Tsukubamachi, Tsukuba-gun, Ibaraki-ken; Tetsurou Ikegaki, Aza 31, Asakawa, Kainancho, Kaifu-gun, Tokushima-ken; Mitsuru Shimizu, 34-3-204, Togashira-3-chome, Toriae-shi; Yoshitane Tuburaya, 277-1, Togashira, Ibaraki-ken, Toriae-shi Ibaraki-ken, all of (JP)

(21) Appl. No.: 08/267,550

(22) Filed: Jun. 21, 1994

(Under 37 CFR 1.47)

Related U.S. Patent Documents

Reissue of:
(64) Patent No.: 4,876,133
Issued: Oct. 24, 1989
Appl. No.: 07/119,471
Filed: Nov. 12, 1987

U.S. Applications:

(63) Continuation of application No. 07/774,623, filed on Oct. 10, 1991, now abandoned.

(30) Foreign Application Priority Data

Nov. 14, 1986 (JP) ..... 61-269905
Dec. 12, 1986 (JP) ..... 61-294983

(51) Int. Cl.[7] ..... B32B 3/02; G11B 5/66; B29C 45/00

(52) U.S. Cl. ..... 428/64.3; 428/694 ML; 428/694 ST; 428/913; 428/920; 430/945; 430/948; 369/272; 346/135.1; 347/256; 347/262; 264/104; 264/299; 264/319; 264/328.12; 264/328.13; 264/328.14; 264/331.11

(58) Field of Search ..... 428/64, 65, 694 ML, 428/694 ST, 913, 920, 64.3; 430/945; 369/272; 346/76 L, 135.1; 264/104, 299, 319, 328.1, 328.8, 328.12, 328.13, 328.14, 331.11; 347/256, 262

(56) References Cited

U.S. PATENT DOCUMENTS 4,120,922 A * 10/1978 Lemelson ..... 264/328.13
4,397,805 A * 8/1983 Holmes ..... 264/328.13
4,627,952 A * 12/1986 Ophir ..... 264/328.12
4,743,409 A * 5/1988 Nomura et al. ..... 264/106
4,764,331 A * 8/1988 Tokuhara et al. ..... 264/106
4,766,021 A * 8/1988 Werner et al. ..... 428/64
4,877,666 A * 10/1989 Machnik et al. ..... 428/64
4,959,252 A * 9/1990 Bonnebat et al. ..... 428/64

* cited by examiner

*Primary Examiner*—Marie Yamnitzky

(57) ABSTRACT

A transparent substrate and a method of producing the same suitable especially for an optical system for an optical data recording medium using a linearly polarized light as a data reading light such as magneto-optical recording medium drive unit and an optical data recording medium for reading data using a linearly polarized light.

38 Claims, 9 Drawing Sheets

OPTICAL DATA RECORDING SYSTEM AND METHOD OF PRODUCTION OF RECORDING MEDIUM

Matter enclosed in heavy brackets [ ] appears in the original patent but forms no part of this reissue specification; matter printed in italics indicates the additions made by reissue.

*This application is a continuation of application Ser. No. 774,623, filed on Oct. 10, 1991, now abandoned which is a reissue of U.S. Pat. No. 4,876,133, issued Oct. 24, 1989 from application Ser. No. 119,471, filed Nov. 12, 1987.*

BACKGROUND OF THE INVENTION

The present invention relates to an optical data recording system and a method of production of a recording medium, or more in particular to an optical system for an optical data recording medium using linearly polarized light as a data reading light such as a magnetooptical recording medium drive system and a transparent substrate suitable especially for an optical data recording medium for reading data by use of linearly polarized light, and a method of production thereof.

In recent years, an optical data recording medium has been closely watched as a large-capacity recording medium comprising a magneto-optical recording film such as a phase-change type recording film or write-once type optical recording film or a reflection film on one side of a transparent substrate which is exposed to a light beam for recording and/or reproducing data. A linearly polarized light or circularly polarized light is used as a recording/reproducing light beam for an optical data recording medium of this type. (See "Analysis of Optical Anisotropy of Polycarbonate Substrate for PhotoMagnetic Recording", by Aihiko Yoshizawa, October 1986 issue of Kogaku).

The linearly polarized light or circularly polarized light, once transmitted through a birefringent medium, becomes an elliptically polarized light, and one of the two components of the linearly polarized light with directions of vibration perpendicular to each other is retarded from the other component. As a result, in the case where the transparent substrate is made of a birefringent medium, the normal process of reading data is adversely affected by the retardation, thereby deteriorating the S/N ratio of the detection signal. Especially in a magneto-optical recording medium, a magneto-optical recording film is formed on one side of a transparent substrate, and data is read out by detecting a change in Kerr rotation angle (direction of rotation of the polarization plane) of the parts formed and not formed with a reversed domain on the magneto-optical recording film due to the linearly polarized light.

In the case where the transparent substrate is a perfectly optical isotropic body without any birefringence, no special problem of data reading is posed regardless of the direction in which the polarization plane of the linearly polarized light making up a data reading light is placed. If the transparent substrate is an optical anisotropic body or is accompanied by birefringence, however, the linearly polarized light entering the transparent substrate becomes an elliptically polarized light while being transmitted therethrough, and the retardation directly acts as a noise component of the detection signal, thereby deteriorating the S/N ratio of the detection signal greatly, except in the case where the polarization plane of the linearly polarized light is set in a specific direction.

In order to reduce or eliminate the deterioration of the S/N ratio of the detection signal by retardation, research efforts have so far been made to prepare a transparent substrate with as small a retardation as possible by selecting a substrate material or conceiving a method of preparing the substrate. As a consequence, a conclusion was reached that a thermoplastic resin such as a polycarbonate resin, though high in productivity, is not suitable as a transparent substrate material for a magneto-optical recording medium, and a thermosetting resin such as an epoxy resin or ceramics such as glass has been suggested in place as a proper material of the transparent substrate.

Ceramics such a glass, however, have disadvantages that (1) cracking or cut is liable to occur so easily that it is difficult to handle during production, use or transport, and (2) a signal pattern such as prepit corresponding to an address signal or a guide track corresponding to a tracking signal is required to be processed through a method of applying a resin replica film transferred from a die by what is called the photo polymerization process, resulting in a low productivity. The problem of a thermosetting resin such as epoxy resin, on the other hand, is an extremely low productivity as compared with the thermoplastic resin to which the injection molding can be applied, in view of the fact that the forming thereof is impossible by other than the casting method (in a which resin in fluid state is injected into a die of predetermined shape and set by heating).

In addition, no matter how small a retardation of a material may be, it is as a matter of fact impossible to obtain a transparent material zero in retardation. Therefore, the conventional technical idea of selecting and using a transparent substrate material low in retardation has an inherent shortcoming that the S/N ratio is unavoidably reduced with the magnitude of retardation of the material.

SUMMARY OF THE INVENTION

The object of the present invention is to provide an optical system for an optical data recording medium which has been developed in order to obviate the above-mentioned problems of the prior art and in which the effect of retardation of a transparent substrate is eliminated optically thereby to read data at high S/N ratio even from an optical data recording medium using a transparent substrate of high retardation.

In order to achieve this object, there is provided according to the present invention an optical system for an optical data recording medium using a linearly polarized light as a data reading light, in which the polarization plane of the data reading light is adjusted within ±5 degree of the direction parallel or perpendicular or 45° to the principal dielectric axis of the optical data recording medium. Specifically, on the basis of the mathematical analysis described in detail below with reference to embodiments, it has been discovered that in an optical system for an optical data recording medium using a linearly polarized light as a recording/reproducing light, it is possible to reduce the noise component of a detection signal due to the retardation to zero by adjusting the polarization plane of the recording/reproducing light in the direction parallel or perpendicular or 45 degree to the principal dielectric axis of the transparent substrate and to reduce the noise component of the detection signal below a tolerable level by keeping the deviation of the polarization plane of the recording/reproducing light from each of the above-mentioned directions within ±3 degrees.

If an optical system for an optical data recording medium having the above-mentioned functions is to be realized, an optical data recording medium with the principal dielectric axis thereof aligned in a predetermined direction is indispensable.

The present invention has been developed in order to satisfy this technical requirement. In an optical data recording medium according to the present invention, a recording film or a reflection film is formed on one side of a transparent substrate, and the data recording/reproducing operation is performed by applying a light beam to the recording film or reflection film. The principal dielectric axis of the transparent substrate is adjusted within ±3 degree from a reference direction arbitrarily set on the transparent substrate or perpendicular or 45 degree thereto. According to another aspect of the present invention, there is provided a method of producing an optical data recording medium including the step of molding a transparent substrate by injecting a melt plastic material into a die having a part of the cavity thereof made up of the information recording pattern side or prepit and pregroove pattern side (hereinafter abbreviated as "signal side") of the stamper, in which the above-mentioned die is provided with a cold slug well and has a gate width less than 1 mm with the injection rate of melt plastic reduced at the time of injection start and end and increased during intermediate time.

DESCRIPTION OF THE PREFERRED EMBODIMENTS

Figure 1:
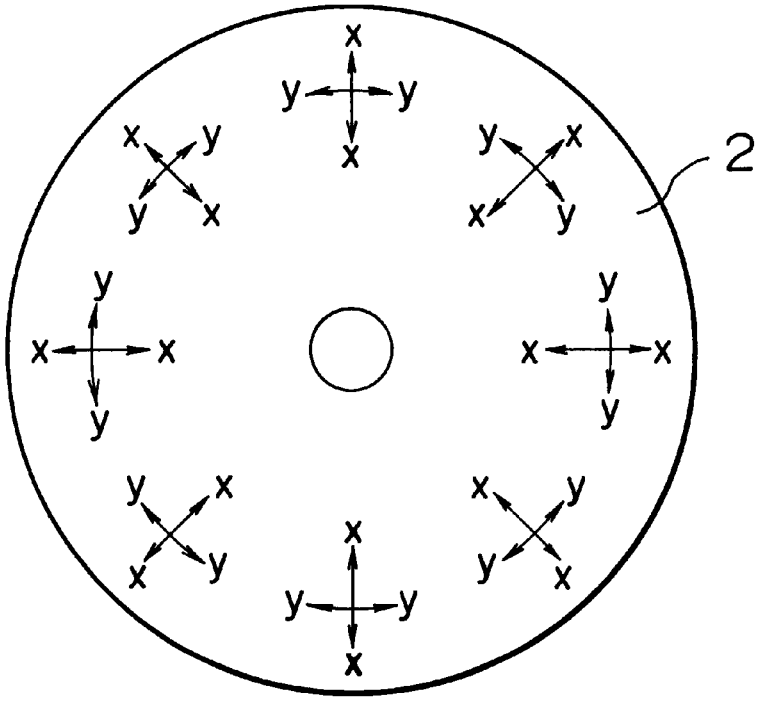
FIG. 1 is a plan view of a transparent substrate according to a first embodiment of the present invention.
Figure 2:
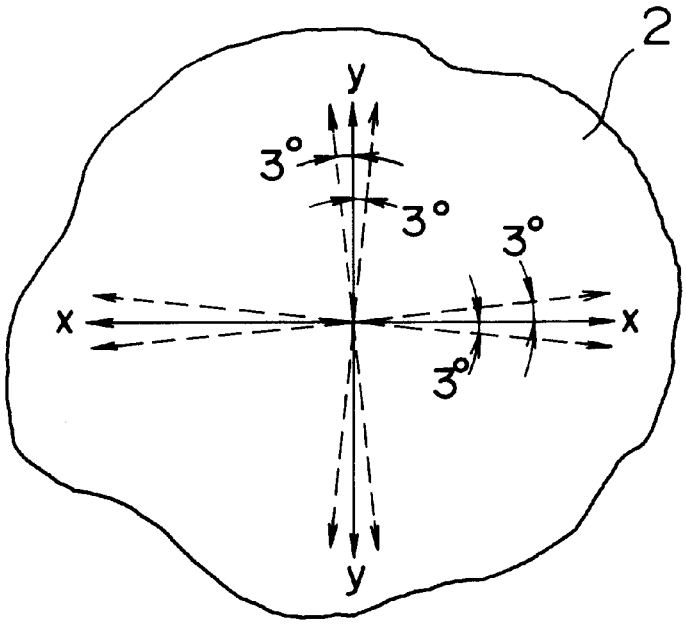
FIG. 2 is a partial plan view of a transparent substrate according to a first embodiment indicating the tolerable range of principal dielectric axis.
Figure 3:
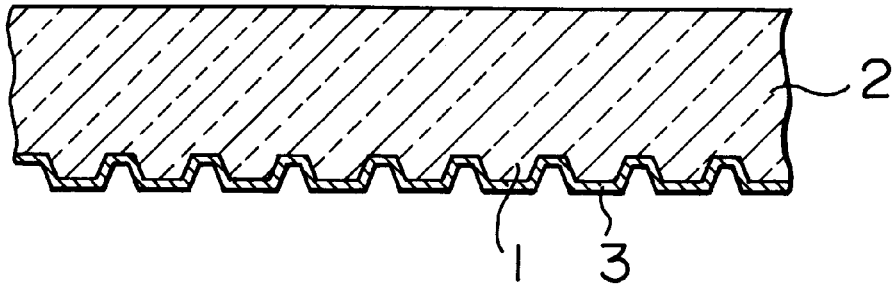
FIG. 3 is a sectional view of the essential parts of an optical data recording medium.

A first embodiment of the present invention is shown in FIGS. 1 to 3. In the first embodiment, the present invention is applied to a disk-shaped recording medium.

The disk-shaped recording medium, as shown in FIG. 3, comprises a transparent substrate 2 of plastic material with a signal pattern 1 such as a guide track or prepit at least on one side thereof and a recording film 3 formed on the film-forming surface of the signal pattern 1 of the transparent substrate 2.

The transparent substrate 2 is formed by injection-molding polycarbonate resin or acrylic resin or polyalkyl methacrylic resin or the like thermoplastic resin. The signal pattern 1 is transferred in spiral or concentric form around the rotational center of the disk-shaped recording medium on one side of the transparent substrate 2 at the same time as the injection molding of the transparent substrate 2. This transparent substrate 2 has a principal dielectric axis extending radially (direction x—x) and in the direction (direction y—y) perpendicular thereto of the transparent substrate 2 as shown in FIG. 1. The direction y—y is along the direction of scanning of the light beam against the disk recording medium, along which the signal pattern is formed. The directions of the principal dielectric axis, as shown in detail in FIG. 2, are allowed to vary in the range of ±5 degree, or preferably, ±3 degree around the radial direction (direction x—x) of the transparent substrate 2 and the direction perpendicular thereto (direction y—y).

The recording film 3 is formed with a given recording material well known as a magneto-optical recording film, a phase-change type recording film or a write once type recording film. Also, in the case of a read-only disk such as a compact disk, the recording film may be replaced with a reflection film.

The transparent substrate for an optical data recording medium according to the present invention is preferably used especially for an optical data recording medium such as a magneto-optical recording medium with linearly polarized light as a data reading light. Such an alloy as TeFeCo may be used as a magneto-optical recording material. The recording film 3 may of course be configured, instead of a single layer of a magneto-optical recording material, of a lamination of this magneto-optical recording material and an enhancement film for improving the reproduction sensitivity or a lamination of these materials and a protective film with equal effect.

In the optical data recording medium according to the first embodiment described above, the principal dielectric axis of the transparent substrate is adjusted within ±5 degree or less or preferably ±3 degree to the direction of scanning the light beam against the optical data recording medium or the direction perpendicular thereto or to a direction at 45 degree to the scanning direction of the light beam. If the polarization plane of the recording/reproducing light is adjusted to the scanning direction of the light beam or the direction perpendicular thereto or a direction 45 degree to the scanning direction of the light beam, the deviation of the polarization plane of the recording/reproducing light from the principal dielectric axis of the transparent substrate is capable of being set in a range within ±5 degree, or preferably ±3 degree. As a result, practical application is realized of a drive unit that can read data at a high S/N ratio from an optical data recording medium having a transparent substrate made of a high retardation material.

Explanation will now be made about a method of producing the transparent substrate 2 according to the first embodiment.

Figure 4:
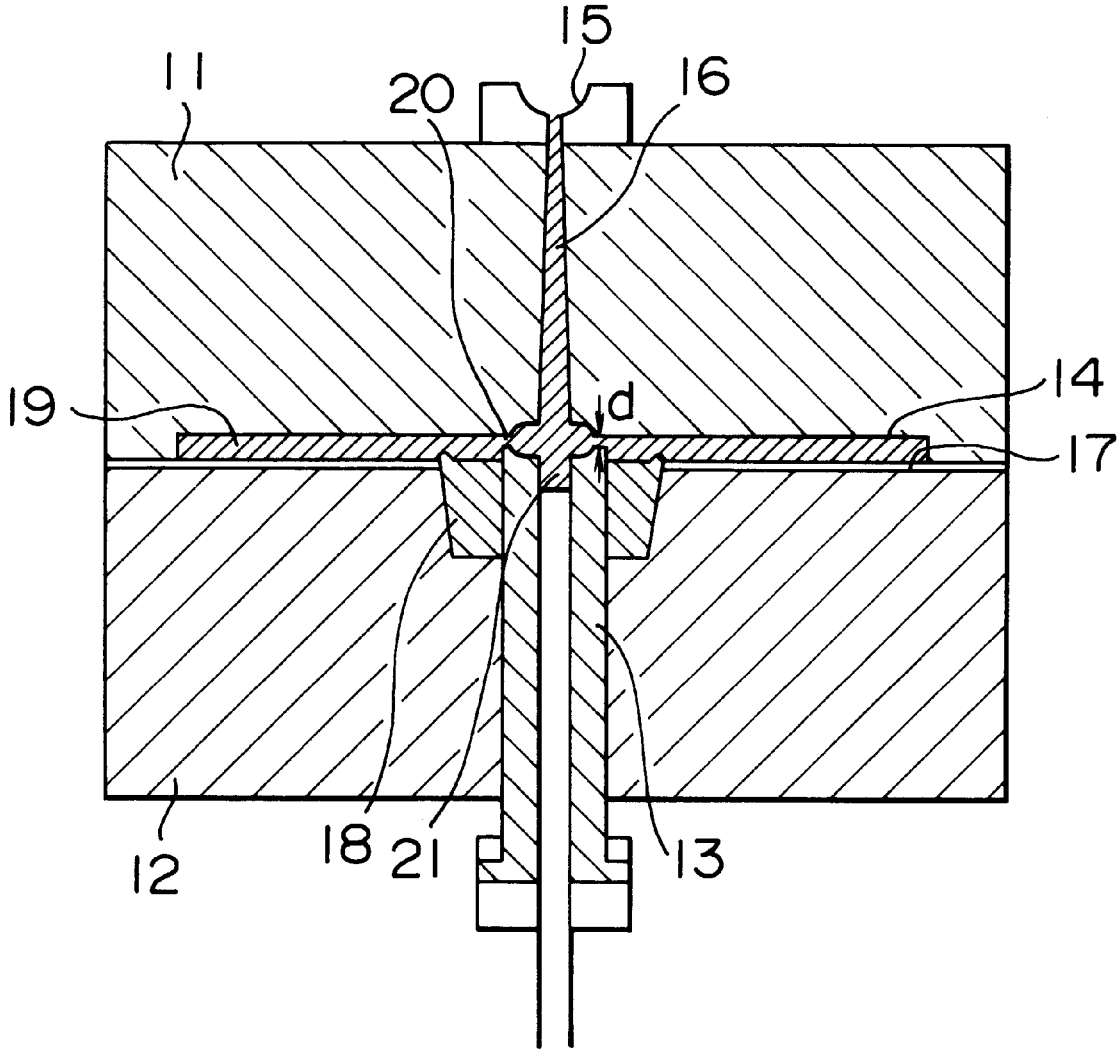
FIG. 4 is a sectional view of a die used for preparing a transparent substrate according to the first embodiment.

FIG. 4 is a sectional view showing the essential parts of a die used for production of a transparent substrate according to the first embodiment. The die mainly includes a fixed die 11, a movable die 12 and a punch 13.

The side of the fixed die 11 facing the movable die 12 is formed with a recess 14 making up a part of the cavity. A sprue 16 communicating with an injection port 15 is formed at the central part of the recess 14.

The side of the movable die 12 facing the fixed die 11 is mounted with a stamper 17 carrying a pattern reverse to the signal pattern desired for transfer to the transparent substrate. The center of the reverse pattern is fixed on the stamper holder 18 in such a manner as to register with the center of the recess 14. The stamper 17 and the recess 14 combine to form a donut-shaped cavity 19 in plain view.

The punch 13 is slidably mounted on the part of the movable die 12 facing the sprue 16. A center gate 20 is configured by appropriately adjusting the clearance d between the forward outer peripheral part of the punch 13 and the inner surface of the recess 14. The thickness of the center gate 20 is adjusted to 1 mm or less, or preferably to 0.1 mm to 0.6 mm. The forward inner peripheral part of the punch 13, on the other hand, is formed with a cold slug well 21 as a recess for storing the low-temperature melt plastic in initial stages of injection. The capacity of this cold slug well 21, which is preferably large for aligning the principal dielectric axes, is more preferably in the range from ½ to 1/7, or most preferably 1/5 of the capacity of the sprue 16 in order to reduce fuel loss for heating the resin material and the dies.

Before the melt plastic is injected into the cavity 19, the resin temperature is controlled to attain 500 to 2000 poise of viscosity of the melt plastic material. Also, the temperature of the dies 14 and 17 are adjusted in such a manner that the temperature distribution along the circumference of the cavity surfaces 14, 17 around the sprue 16 is not more than ±5° C., and that the temperature Tc of the cavity surfaces 14, 17 of the dies holds the relations $Tg-80 \leqq Tc \leqq Tg$ where Tg is the transmission temperature of the resin.

The melt plastic is not necessary injected into the cavity 19 at a fixed rate from start and end of injection, but may be subjected to a multi-stage injection rate control as described below. First, the melt plastic material is injected at a comparatively low rate, and the resin cooled while being passed through the sprue 16 is stored in the cold slug well 21. Then, the resin is injected at a comparatively high rate in order to prevent the resin temperature from decreasing while the melt plastic material is being filled in the cavity 19. Finally, the injection rate is reduced in order to prevent backlash of resin at the cavity end. This multi-stage control of injection rate is not limited to three stages described above, but any desired number of stages may be set as required. For the purpose of improved productivity, however, it is desirable to set the injection rate to 0.2 to 1.0 sec in any case.

Figure 5:
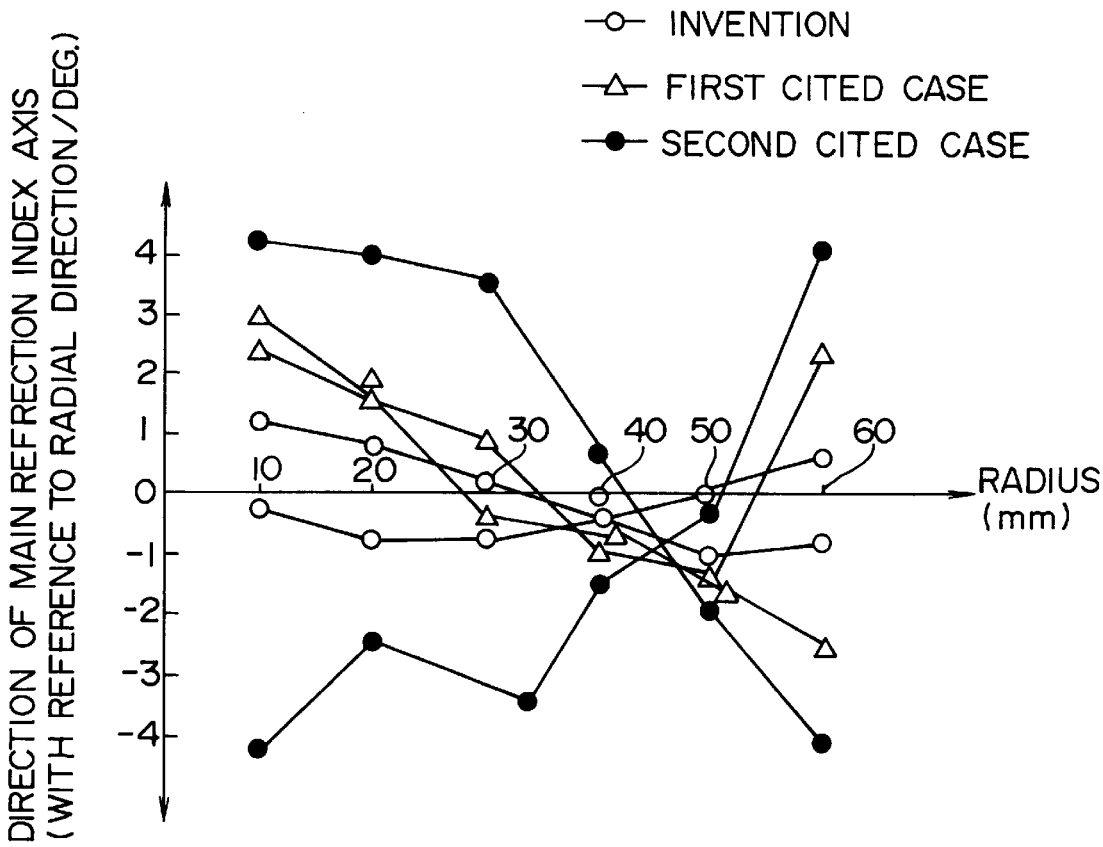
FIG. 5 is a graph showing the effect of a transparent substrate produced by the method according to the present invention.

FIG. 5 shows a comparison of variations in principal dielectric axes between a transparent substrate (the present invention) formed with the injection rate of the melt plastic subjected to multi-stage control under the same conditions as the above-mentioned embodiment in die and resin temperatures, a transparent substrate (first cited case) molded without any multistage control of injection rate under the same temperature conditions and with the same die as the present invention, and a transparent substrate (second cited case) not provided with any cold slug well and molded in a die having a gate thickness d adjusted to 1 mm with the injection rate subjected to multi-stage control under the same temperature conditions as the present invention.

In FIG. 5, the abscissa represents the radius of the transparent substrate, and the ordinate the deviation of the principal dielectric axis with the radial line as a reference. The present invention is indicated by a white circle, the first cited case by a white triangle, and the second cited case by a black circle, each including two examples.

As obviously seen from this graph, the transparent substrate according to the present invention has a deviation of the principal dielectric axis from the radial line not more than ±1 degree along the inner and outer peripheries. In contrast, the transparent substrate of the first cited case is such that one of the two examples has a deviation of the principal dielectric axis not more than ±2 degree from the radial line, while the other example has a deflection as much as ±2.5 degree. In the case of the transparent substrate of the second cited case, the deviation of the principal dielectric axis from the radial line reaches about ±3.5 degree. It will therefore be understood that the transparent substrate of the present invention facilitates the adjustment of the polarization plane of the reading light, thereby making it possible to reduce the S/N ratio of the detection signal.

Figure 6:
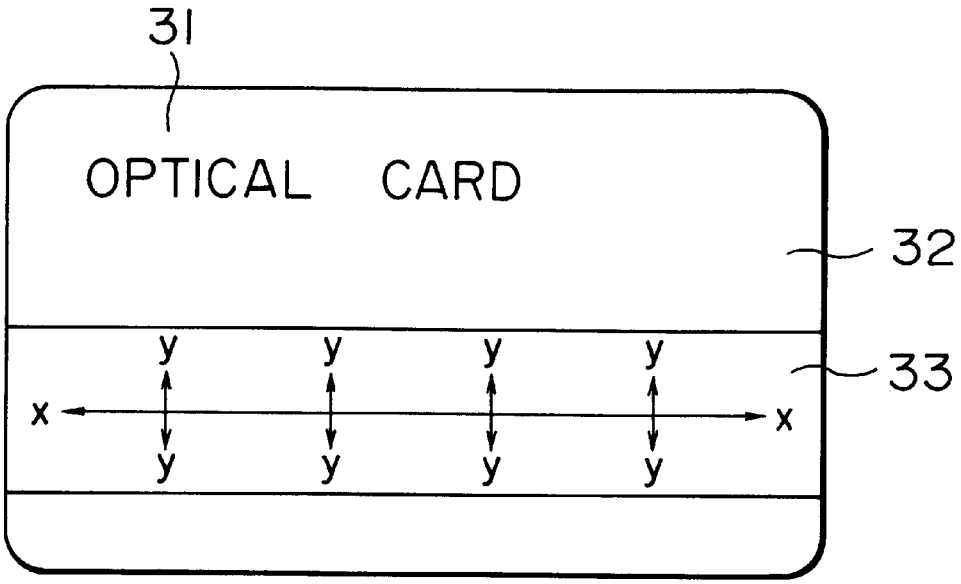
FIG. 6 is a plan view of an optical data recording medium according to a second embodiment of the present invention.

A second embodiment of the present invention is shown in FIG. 6. In the second embodiment, the present invention is applied to a card-like recording medium.

This card-like recording medium has a part of the transparent substrate 32 carrying a predetermined indication 31 or the like as shown in FIG. 6, which part is formed with a recording area 33 with a signal pattern and a recording film (not shown).

This card-like recording medium is scanned in the longitudinal direction of the transparent substrate 3 (direction x—x), along which the signal pattern is formed. The principal dielectric axis of this transparent substrate 32 is allowed in the range of ±5 degree, or preferably ±3 degree around the longitudinal direction (direction x—x) of the transparent substrate 32 or the direction perpendicular thereto (direction y—y). The same transparent substrate material and recording film material as in the first embodiment described above may be used in the embodiment under consideration.

The optical data recording medium according to the second embodiment explained above has the same effect as that according to the first embodiment.

A method of producing the transparent substrate 32 according to the second embodiment will be explained below.

Figure 7:
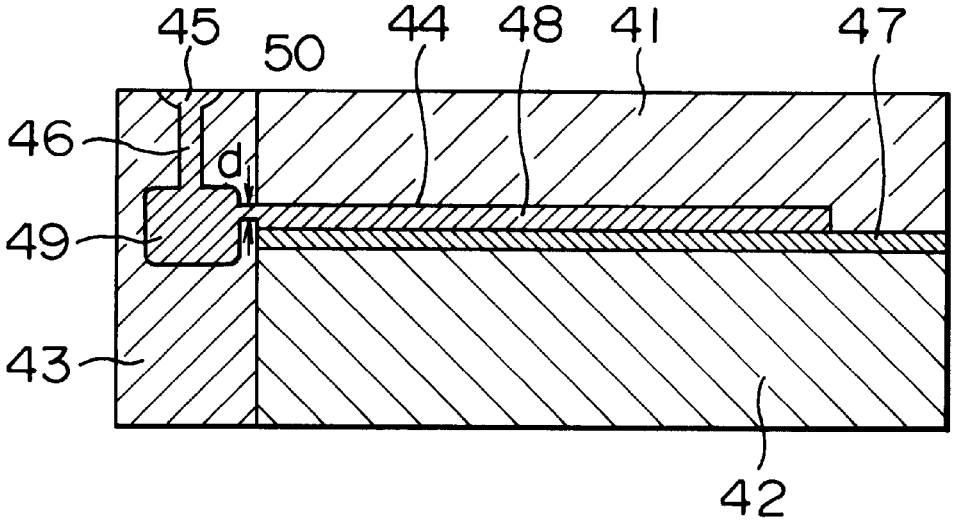
FIG. 7 is a sectional view of a die used for preparing a transparent substrate according to a second embodiment.

FIG. 7 is a sectional view of the essential parts of a die used for production of a transparent substrate according to the second embodiment, in which reference numeral 41 designates a fixed die, numeral 42 a movable die, and numeral 43 a substrate member.

The side of the fixed die 41 that faces the die 42 is formed with a rectangular recess 44 in plan view making up a part of the cavity. The part of the gate member 43 which communicates with an end of the recess 44 is formed with a sprue 46 extending from the injection port 45.

The side of the movable die 42 facing the fixed die 41 is mounted with a stamper 47 formed with an inverted pattern of the desired information recording pattern to be transferred to the transparent substrate. This stamper 47 and the recess 44 combine to make up a rectangular cavity 48 in plan view.

The gate member 43 is arranged on the resin injection side of the movable die 42, and has a cold slug well 49 formed as a recess at the part thereof facing the sprue 46. The part of the gate member 43 that is in contact with the movable die 42 and the inner surface of the recess 44 of the fixed die 41 make up a gate 50.

The temperature conditions of the dies 41, 42 the temperature conditions of the melt plastic material injected into the dies 41, 42, the gate thickness d, capacity of the cold slug well 49 and the injection rate in multi-stage control, are all set in the same manner as in the first embodiment.

Variations in principal dielectric axis were compared among the transparent substrate (the invention) according to the second embodiment molded using a die of FIG. 7 with the gate thickness d adjusted to 0.3 mm and the die and resin temperatures set in the same manner as in the foregoing embodiment while the injection rate of the melt plastic material is controlled in multiple stages, a transparent substrate molded using the same die as in the present embodiment under the same temperature conditions without any multi-stage control of the injection rate, and a transparent substrate molded using a die with the gate thickness d thereof adjusted to 1 mm without any cold slug well under the same temperature conditions as the present embodiment with the injection rate controlled in multiple stages. The result was almost the same as in FIG. 5.

Figure 8:
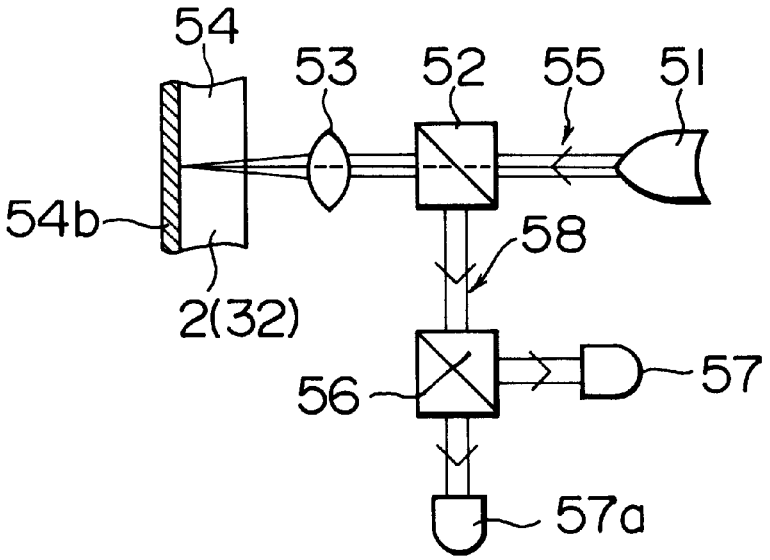
FIG. 8 is a diagram showing an optical circuit of a drive unit used for an optical data recording medium according to the present invention.

Now, explanation will be made of an embodiment of an optical system for an optical data recording medium in which data is optically recorded and or reproduced by use of an optical data recording medium prepared from a transparent substrate of resin according to the above-mentioned mentioned embodiment. An optical circuit of an optical system for an optical data recording medium according to the present invention is shown in the diagram of FIG. 8. As shown in the diagram, the optical circuit of the optical system for the optical data recording medium according to the present invention includes an incident path 55 mainly having a laser 51, a half prism 52, a converging lens 53 and an optical data recording medium 54, and a reflection path 58 having the optical data recording medium 54, a converging lens 53, a half prism 52, a polarization beam splitter 56 and detectors 57, 57a.

The laser 51 takes the form of a semiconductor laser or a laser equipped with a linear polarizer. The linearly polarized light is radiated to the optical data recording medium 54 through the incident light path 55.

The optical data recording medium 54, on the other hand, is formed of a recording film (magnetic film) 54b on one side of the transparent substrate 2 (32), and is arranged on the incident light path 55 in such a manner that the transparent substrate 2 (32) faces the converging lens 53 with the recording film 54b disposed on the back of the converging lens 53. The transparent substrate 2 (32) may take the form of a material very small in retardation such as glass or epoxy resin an injection mold of a thermoplastic resin, very large in retardation such as polycarbonate resin, acrylic resin or polyalkyl methacrylic resin.

The converging lens 53 is arranged in such a way that the linearly polarized light entering from the incident light path 55 is focused on the recording film 54b of the optical data recording medium 54.

In the incident light path 55 configured as above, the plane of polarization of the linearly polarized light radiated from the laser 51 is adjusted in such direction as to reduce the noise component of the detection signal attributable to the retardation taking the direction of the principal dielectric axis of the transparent substrate 2 (32) into consideration. Specifically, the plane of polarization of the linearly polarized light is adjusted to a direction parallel, perpendicular or 45 degree to the principal dielectric axis of the transparent substrate 2 (32). In this way, the noise component of the detection signal attributable to the retardation is reduced to zero. Even in a highgrade system, the intensity ratio of the noise component is allowable up to about 20 dB for practical purposes. Therefore, the plane of polarization of the linearly polarized light may be adjusted within ±3 degree around the direction parallel, perpendicular or 45 degree to the principal dielectric axis of the transparent substrate 2 (32). Further, in the case of low- or middle-grate system of which the intensity ratio of the noise component is allowable up to about 40 dB, the plane of polarization may be adjusted within ±5 degree.

Figure 15:
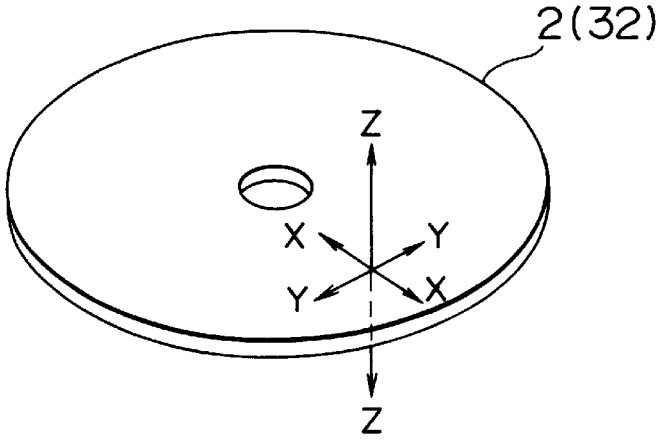
FIG. 15 is a perspective view of a transparent substrate showing a direction of a principal dielectric axis as normally seen in a transparent substrate being formed by injection-molding.

Assume that the transparent substrate 2 (32) is disk-shaped and is molded by injection of thermoplastic resin. In view of a method of injection molding normally employed, it is well known that the principal dielectric axis is positioned along the radial direction (direction x—x) of the disk, the peripheral direction (direction y—y) perpendicular thereto and along the thickness (direction z—z) as shown in FIG. 15. In this case, the plane of polarization of the linearly polarized light may be adjusted around the direction x—x, y—y or 45 degree thereto.

These angles of the polarization plane of the linearly polarized light against the principal dielectric axes may be applied to a transparent substrate having a principal dielectric axis of a given direction by measuring the principal dielectric axis of the transparent substrate involved in advance.

The polarization light beam splitter 56 is made up of an analyzer and is positioned at an appropriate angle to the reflection light path 58. Also, the detectors 57, 57a are arranged on two light paths divided by the polarization light bean splitter 56.

Explanation will be now made about the reason why the noise component of the detection signal detected by the detectors 57, 57a can be reduced without regard to the magnitude of retardation of the transparent substrate 2 (32) in the above-described optical system for an optical data recording medium.

FIG. 8 is a diagram showing an optical circuit of an optical data recording medium drive unit for recording/reproducing data with the optical data recording medium. This optical circuit includes an incident light path 55 mainly having a laser 51, a half prism 52, a converging lens 53 and an optical data recording medium 54, and a reflected light path 58 having the optical data recording medium 54, a converging lens 53, a half prism 52, a polarization light beam splitter 56 and detectors 57, 57a.

The laser 51 takes the form of a semiconductor laser or a laser equipped with a linear polarizer. The linearly polarized light is adapted to enter the optical data recording medium through the incident light path 55. Also, the polarized light beam splitter 56 is made up of an analyzer and set at an appropriate angle to the reflection light path 58.

Figure 9:
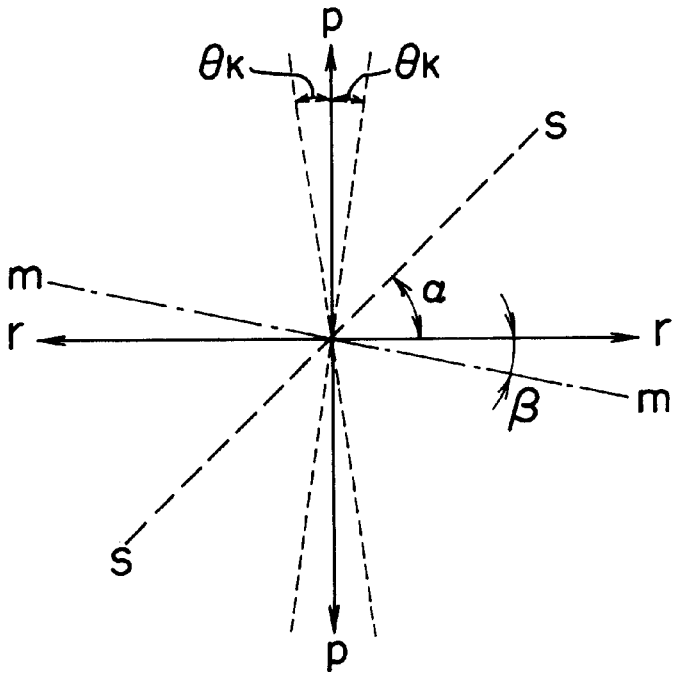
FIG. 9 is a diagram for explaining parameters of a formula.

First, as shown in FIG. 9, assume that the angle between the plane r—r perpendicular to the polarization plane p—p of the linearly polarized light and the plane s—s of the transmitted light of the polarized light beam splitter is $\alpha$, and the angle between the plane r—r perpendicular to the polarization plane p—p of the linearly polarized light and the principal dielectric axis m—m of the transparent substrate is $\beta$. Then, the intensity I of the light entering the detectors 57, 57a is expressed by the equation (1) below. In the equation, $\delta$ designates the magnitude of retardation, and $\theta_k$ the Kerr rotation angle.

$$I = (\sin^2\alpha\cos^2\theta_k + \cos^2\alpha\sin^2\theta_k) + \sin 2\beta\sin(2\alpha + 2\beta)\sin^2\delta\cos^2\theta_k - (1/2)\cos\delta\sin 2\alpha\sin 2\theta_k \quad (1)$$

The first term of the equation (1) above represents a bias component unrelated to the sign of the Kerr rotation angle $\theta$, the second term the noise component due to the retardation, and the third term a signal component representing the change in $\theta_k$ that can be produced as a signal. As a result, the noise component of the second term may be removed by adjusting the plane of polarization of the data reading light so that $\sin(2\alpha+2\beta)=0$ or $\sin 2\delta=0$.

As seen from the third term of the equation (1) above, the signal intensity may be maximized by adjusting the angle $\alpha$ to 45 degree.

Also, the bias component may be removed by subtracting the light intensity $I(\alpha)$ from $1(-\alpha)$ entering the two detectors 57, 57a as shown in the equation (2) below.

$$I(\alpha)-I(-\alpha)=\sin^2\delta\sin 2\alpha\sin^4\beta\cos^2\theta_k-\cos\delta\sin 2\alpha\sin 2\theta_k \quad (2)$$

The equations (1) and (2) hold for the light component that is transmitted through the center of the converging lens 53 and entering at right angle to the transparent substrate 2 (32) of the optical data recording medium 54, but not for the light component that enters diagonally to the transparent substrate 2 (32) from the peripheral parts of the converging lens 53. The effect of retardation on the light components entering diagonally will be studied below.

Figure 10:
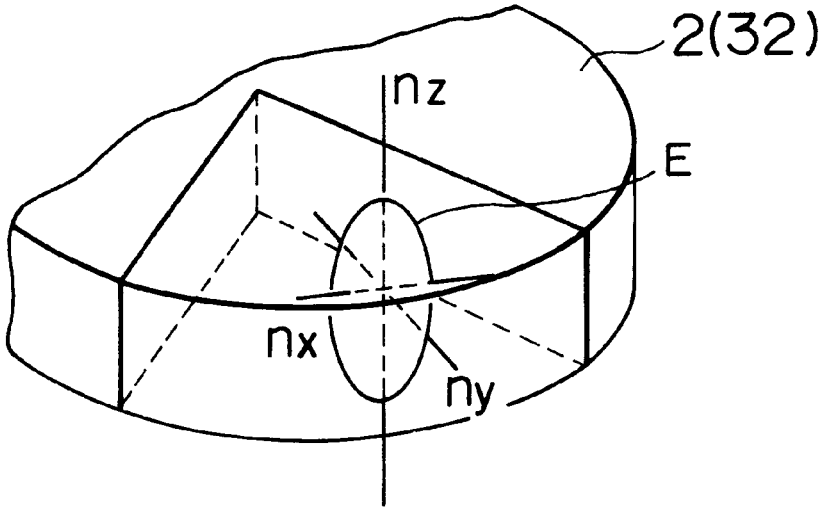
FIGS. 10 and 11 are diagrams for explaining an index ellipsoid.
Figure 11:
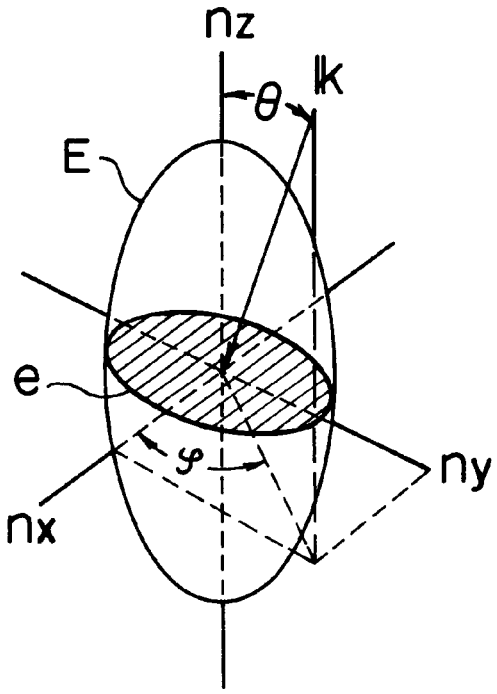

The effect of retardation on the incident light component entering the transparent substrate diagonally from the peripheral part of the converging lens 53 is determined by assuming an index ellipsoid (normal ellipsoid) given by the function of the main refraction index specific to the transparent substrate material within the transparent substrate 2 (32) as shown in FIGS. 10 and 11. Specifically, let the main refraction index along the peripheral direction of the transparent substrate 2 (32) be nx, the main refraction index along the diameter be ny, and the main refraction index along the perpendicular direction be nz. Then, the index ellipsoid is given by the equation (3) below.

$$\frac{x^2}{nx^2}+\frac{y^2}{ny^2}+\frac{z^2}{nz^2}=1 \quad (3)$$

This index ellipsoid E is assumed within the transparent substrate 2 (32) as shown in FIG. 10, and the light of intensity K is assumed to enter at an angle $\theta$ main refraction index axis nz and the angle $\phi$ to the main refraction index nz as shown in FIG. 11. Then, the retardation is expressed by the difference in length between long and short axes of an ellipsoid e formed in the sectional area cut from the index ellipsoid E in a plane perpendicular to K and passing the origin O. The value of retardation varies with the angle between the direction of polarization of the incident light k and the main axis of the ellipsoid e of the sectional area to the degree $\Omega$ determined from the function $\Omega(\theta, \phi)$ of $\theta$ and $\phi$ described above.

When the peripheral directions (with incident angle $\theta$ constant in FIG. 10) of the converging lens 33 is considered, the light converged at the converging lens 53 contains diagonal incident light components from all directions $\phi$ ($0\leqq\phi\leqq 2\pi$), each estimated to have a substantially constant intensity. The signals detected by the detectors 57, 57a are obtained as a total sum of these components, and therefore the effect of the retardation due to the diagonal incident light components as a noise component on the detection signals is expected to be offset along the peripheral directions of the converging lens 53.

Figure 12:
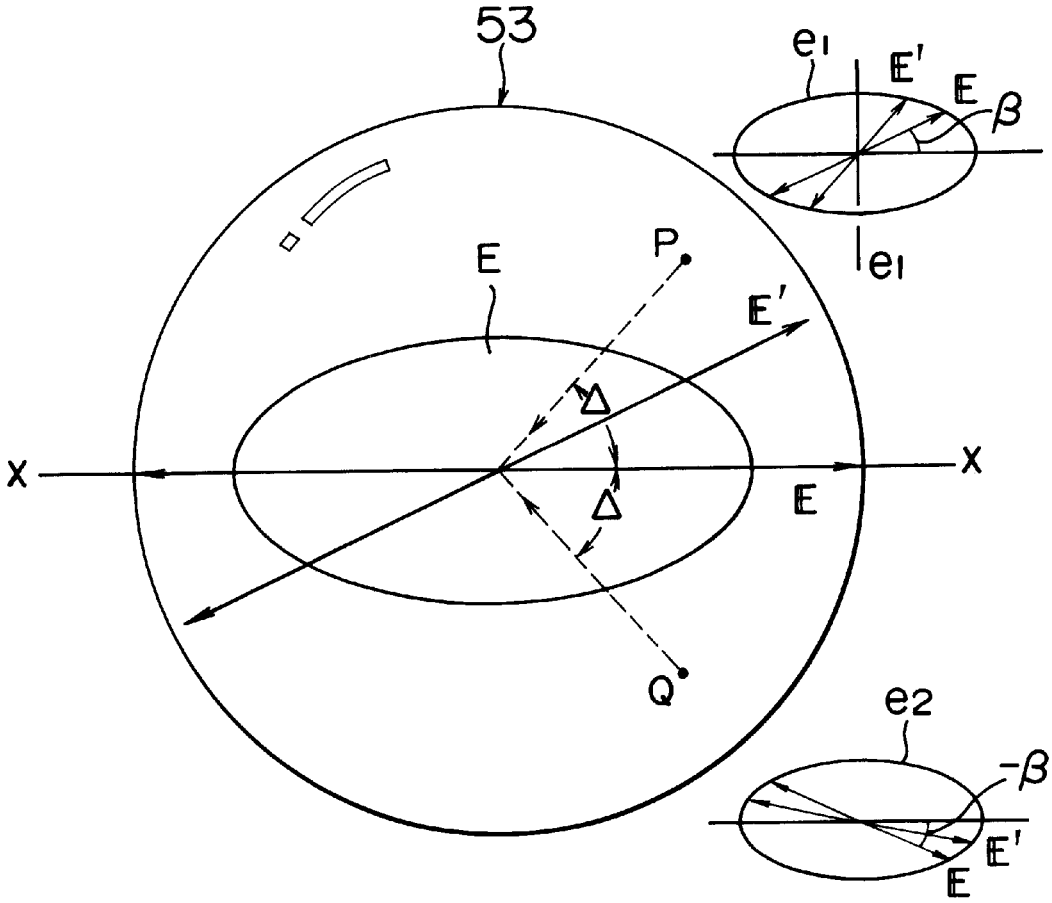
FIG. 12 is a diagram for explaining the relationship between an incident point on a lens and the retardation.

The reasonableness of the foregoing assumption will be studied below with reference to FIG. 12. In FIG. 12, numeral 53 designates a converging lens, characters E, E a plane of incident light polarization, E an index ellipsoid assumed within the transparent substrate arranged perpendicular (along the page), and x—x the principal dielectric axis of the transparent substrate. Now, assume, as shown in FIG. 12, that a linearly polarized light is radiated in such a direction that the plane of incident polarized light E is parallel to the principal dielectric axis x—x of the transparent substrate. In this case, the light entering the transparent substrate diagonally through two points P and Q on the converging lens 53 symmetric with respect to the main dielectric axis x—x has the same incident angle $\theta$ and the same absolute value of incident angle $\phi$, and therefore, when the index ellipsoid E is cut in the plane perpendicular thereto passing through the origin of the index ellipsoid E, the ellipsoids $e_1$ and $e_2$ formed in the cut section have the same shapes and equal retardation $\delta$.

Figure 13:
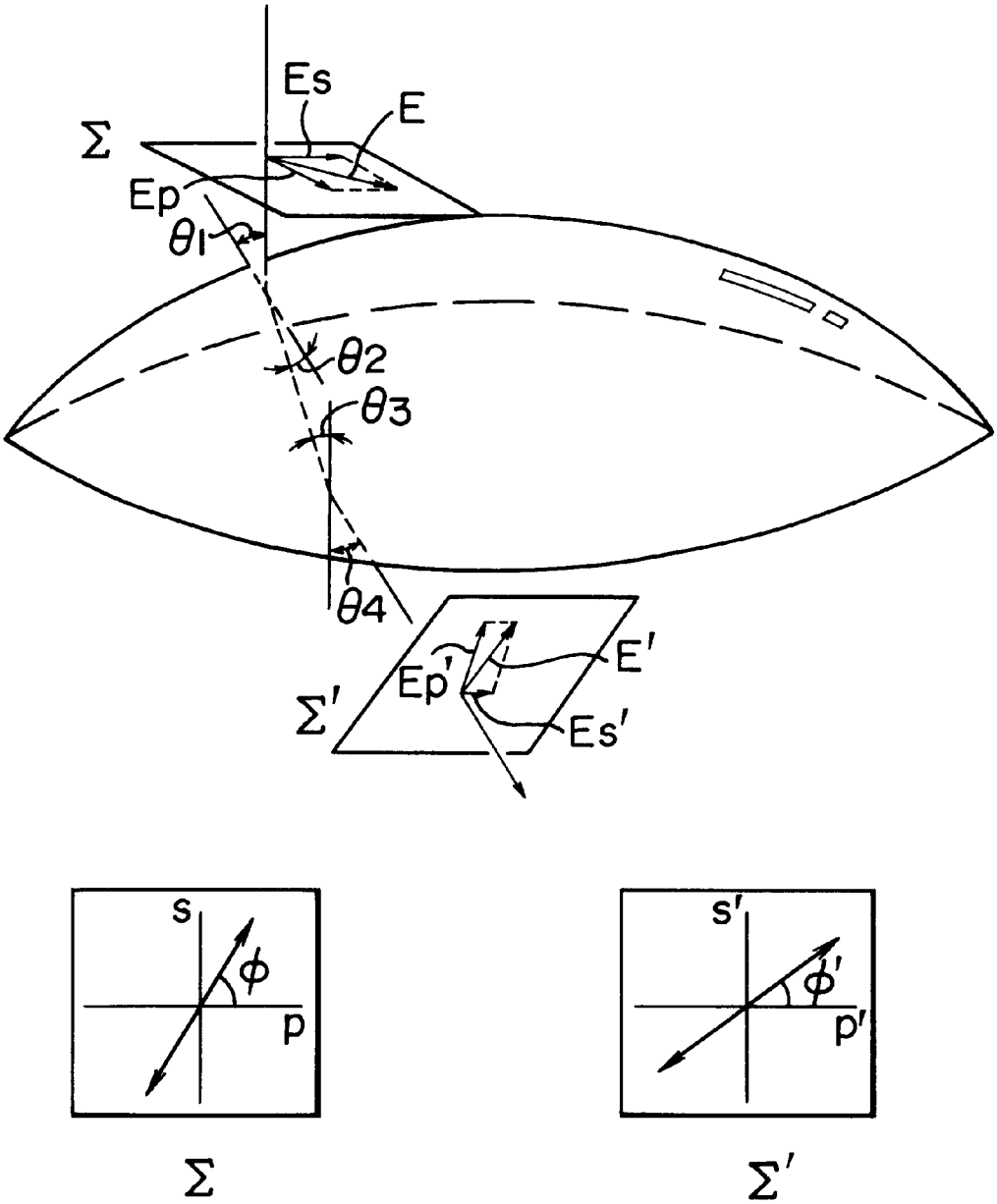
FIG. 13 is a diagram for explaining a change in the polarization plane with light convergence.

It is known that when the light is transmitted through the converging lens 53, the plane of incident polarized light changes from E to E' as shown in FIG. 13. In FIG. 13, the wave front of the linearly polarized light before incidence is assumed to be $\Sigma$, the plan of polarization of the linearly polarized light before incidence to be E, the angle between the plane of polarization E on the wave front $\Sigma$ and the direction $E_p$ of the p wave to be $\phi$, the plane of wave of the linearly polarized light after transmission to be $\Sigma'$, the plane of polarization of the linearly polarized light after transmission to be E, the angle between the plane of polarization on the wave front $\Sigma$ and the direction E of the p wave to be $\phi'$, the angle between the normal to the incident plane and the direction of incidence of the linearly polarized light to be $\theta_1$, the angle between the normal to the incident plane and the direction of progress of the linearly polarized light refracted to be $\theta_2$, the angle between the normal to the outlet plane and the linearly polarized light making progress through the converging lens to be $\theta_3$, and the angle between the normal to the outlet plane and the linearly polarized light after transmission to be $\theta_4$. Then, the amount of change in the plane of incident polarized light is determined from equation (4) below.

$$\tan\phi'=\tan\phi\cos(\theta_1-\theta_2)\cos(\theta_3-\theta_4) \quad (4)$$

Since the points P and Q exist on the same periphery of the lens, the values of $\theta_3$ in FIG. 13 are equal, and so the values of $\theta_2$, $\theta_3$ and $\theta_4$ are also equal. As a result, the coefficient associated with $\tan\phi$ in the equation (4) also become equal. Also, because the angle $\phi$ is expressed by the angle $\Delta$ in FIG. 12 with an equal absolute value and a reverse sign, the absolute value of $\phi'$ in equation (4) is also equal with a reverse sign ($\pm\beta$).

When the angles $\beta$ and $-\beta$ hold this relationship, the sum thereof results in the first term of equation (1) being zero. As described above, the light converged at the converging lens 53 contains diagonal incident light components entering from all directions with the intensity of each incident light estimated to be substantially fixed. Therefore, the above-mentioned relationship between P and Q holds for all the light-transmitted parts on the converging lens 53. As a consequence, the integration about all the light-transmitted part on the converging lens 53 makes the first term of equation (2) zero, thus removing the noise component attributable to the retardation of diagonal incident light components.

In the case where the incident light is not parallel to the principal dielectric axis as shown by E in FIG. 12, on the other hand, the absolute values of the angle $\beta$ and $-\beta$ are not equal to each other as indicated by $e_1$ and $e_2$ in the drawing, and therefore the sum of the first term of equation (2) cannot be made zero.

Figure 14:
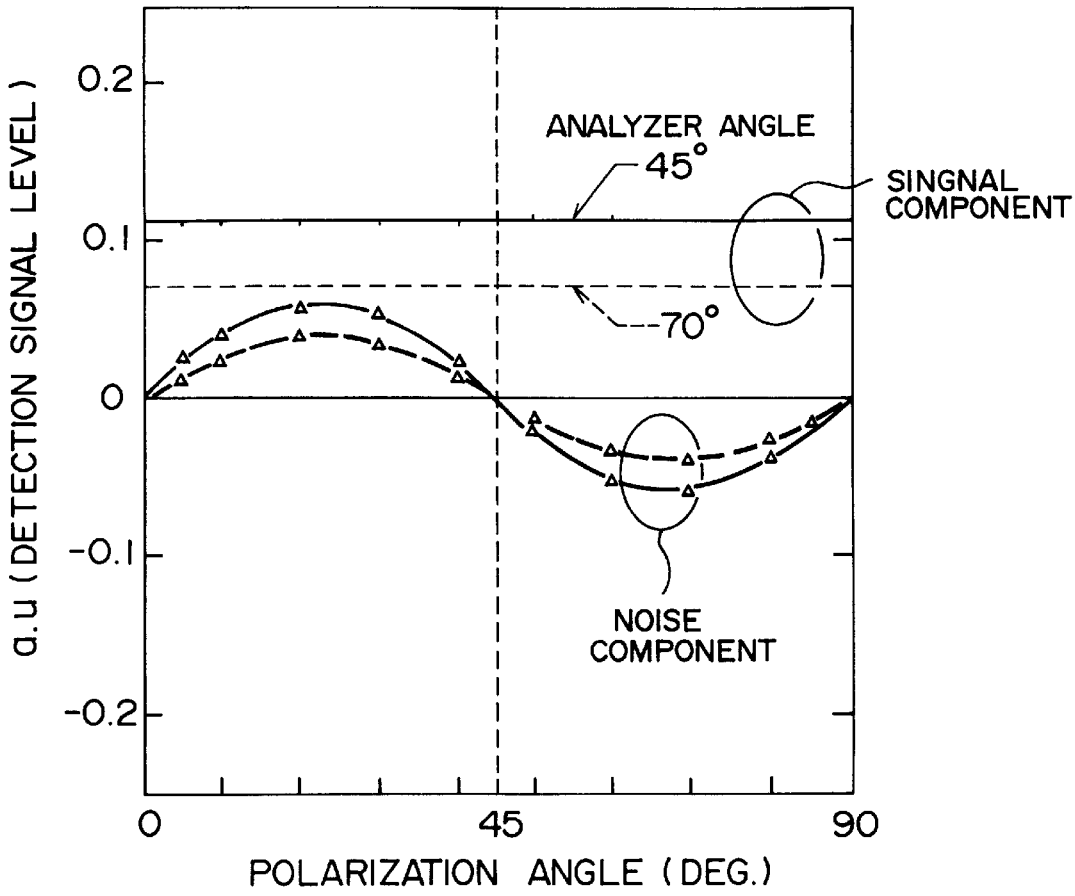
FIG. 14 is a graph showing the relationship between the angle formed by the polarization plane of the data reading light to the principal dielectric axis of the transparent substrate and noises caused by the retardation.

The magnitude of the noise due to retardation of the optical circuit according to the present invention was computed for the differential detection method on the assumption that the intensity distribution of the recording/reproducing light is Gaussian using the equations (1) to (4). The result shown in FIG. 14 was obtained.

In this graph, the abscissa represents the angle between the plane of polarization of the recording/reproducing light linearly polarized and the principal dielectric axis of the transparent substrate, and the ordinate the level of the detection signal. Also, the solid line indicates the case in which the analyzer angle of the polarized light beam splitter is set to 45 degree and the dashed line the case in which the analyzer angle of the polarized light beam splitter is set to 70 degree.

As obvious from this graph, regardless of the analyzer angle, the noise component of the detection signal is reduced to zero by setting the angle between the plane of polarization of the recording/reproducing light and the principal dielectric axis of the transparent substrate to zero, 45 degree or 90 degree. It has also be found from this graph that if the deflection between the plane of polarization of the recording/reproducing light and the principal dielectric axis of the transparent substrate is held within ±3 degree, the noise levels of the detection signal is substantially the same as in the case where the light enters a transparent substrate of glass without adjusting the plane of polarization of the linearly polarized light.

Explanation was made above with reference to an embodiment in which the principal dielectric axis of the transparent substrate is adjusted within ±3 degree of the direction along, perpendicular or 45 degree to the scanning of a light beam on the optical data recording medium. The present invention is not confined to such a case, but the principal dielectric axis may alternatively adjusted within ±3 degree of any reference direction set on the optical data recording medium under a predetermined rule or perpendicular thereto or 45 degree to the scanning direction of the light beam.

I claim:

1. An optical data recording medium comprising a transparent substrate, and a selected one of a recording film and a reflection film on one side of the transparent substrate for recording and/or reproducing data by radiating a light beam on said selected one of the recording film and the reflection film, wherein a given principal dielectric axis of the transparent substrate is set in regular manner within ±5 degrees of at least a selected one of the direction parallel, perpendicular and 45 degrees to a scanning direction of the light beam.

2. An optical data recording medium according to claim 1, wherein said given principal direction axis of the transparent substrate is set in regular manner within ±3 degrees of said at least a selected one of the directions.

3. An optical data recording medium according to claim 2, wherein the transparent substrate is in the form of a disk, whereby the recording medium is an optical data recording disk.

4. An optical data recording medium according to claim 3, wherein said principal dielectric axis of the transparent substrate is set in a regular manner within ±3 degrees of at least a selected one of the radial direction, the circumferential direction and a direction of thickness of the transparent substrate in the form of a disk.

5. An optical data recording medium according to claim 3, wherein [aid] *said* given principal dielectric axis of the transparent substrate is set in a regular manner within ±3 degrees of at least a selected one of the radial direction, the circumferential direction and a direction 45 degrees to the radial direction of the transparent substrate in the form of a disk.

6. An optical data recording medium according to claim 2, wherein the transparent substrate is rectangular.

7. An optical data recording medium according to claim 6, wherein the rectangular transparent substrate is a card, whereby the recording medium is an optical data recording card.

8. An optical data recording medium according to claim 7, wherein the rectangular transparent substrate has an outer peripheral longitudinal line, and wherein said principal dielectric axis of the transparent substrate is set in a regular manner within ±3 degrees of at least a selected one of a direction parallel to the outer peripheral longitudinal line, a direction perpendicular to the direction parallel to the [other] *outer* peripheral longitudinal line and a direction 45 degrees to the direction parallel to the outer peripheral longitudinal line of the rectangular transparent substrate.

9. An optical data recording medium according to claim 1, wherein said selected one of a recording film and a reflection film is made of a magneto-optical recording material whereby a magneto-optical recording medium is formed.

10. An optical data recording system comprising:

an optical data recording medium including a transparent substrate; and a selected one of a recording film and a reflection film on one side of the transparent substrate for recording and/or reproducing data by radiating a light beam on said selected one of the recording film and the reflection film, said transparent substrate having a reference principal dielectric axis that is arranged regularly in a desired direction and an optical unit for emitting a linearly polarized light *beam* as said light beam, wherein [the principal dielectric axis of the transparent substrate of the optical data recording medium] *a plane of polarization of said linearly polarized light beam* is set within ±5 degrees of at least one of the directions parallel, perpendicular and 45 degrees to [a scanning direction of said light beam] *the principal dielectric axis of the transparent substrate of the optical data recording medium.*

11. An optical data recording system according to claim 10, wherein said principal dielectric axis is set within ±3 degrees of said at least a selected one of the directions.

12. An optical recording system according to claim 11, wherein the optical unit is positioned, relative to the optical data recording medium, such that said light beam passes through the transparent substrate in irradiating said selected on of the recording film and the reflection film.

13. An optical data recording system according to claim [16] *10*, wherein the transparent substrate is in the form of a disk, whereby the recording medium is an optical data recording disk.

14. An optical data recording system according to claim 10, wherein the transparent substrate is rectangular and in the form of a card, whereby the recording medium is an optical data recording card.

15. An optical data recording system according to claim 10, wherein the optical unit is positioned, relative to the optical data recording medium, such that said light beam passes through the transparent substrate in irradiating said selected one of the recording film and the reflection film.

16. A method of producing an optical data recording medium comprising the step of molding a transparent substrate by injecting a melt plastic material to die surfaces with a part of the cavity surface thereof formed by the signal side of a stamper, wherein said die is formed with a cold slug well and has a gate width less than 1 mm, said melt plastic material being injected at [a low rate] *first rates* in the beginning and end of injection and at a [high] *second* rate during intermediate time, *the the first rates being smaller than the second rate.*

*17. An optical data recording system comprising:*

*an optical data recording medium including a transparent substrate in the form of a disk, whereby the recording medium is an optical data recording disk, and a selected one of a recording film and a reflection film on one side of the transparent substrate for recording and/or reproducing data by radiating a linearly polarized light beam on said selected one of the recording film and the reflection film, a given principal dielectric axis of the transparent substrate being set within ±3 degrees of at least one of a radial direction, a circumferential direction and a direction of thickness of the transparent substrate; and*

*an optical unit for emitting a linearly polarized light as said light beam, wherein a plane of polarization of said linearly polarized light beam is set within ±5 degrees of a selected one of directions parallel, perpendicular and 45 degrees to the principal dielectric axis of the transparent substrate of the optical data recording medium.*

*18. An optical data recording system according to claim 17, wherein the given principal dielectric axis of the transparent substrate is set within ±3 degrees of the direction of thickness of the transparent substrate, and the plane of polarization of the linearly polarized light beam is set within ±5 degrees of a direction parallel to said principal dielectric axis in the direction of thickness of the transparent substrate.*

*19. An optical data recording system comprising:*

*an optical data recording medium including a transparent substrate in the form of a disk, whereby the recording medium is an optical data recording disk, and a selected one of a recording film and a reflection film on one side of the transparent substrate for recording and/or reproducing data by radiating a linearly polarized light beam on said selected one of the recording film and the reflection film, a given principal dielectric axis of the transparent substrate being set within ±3 degrees of at least one of a radial direction, a circumferential direction and a direction 45 degrees to the radial direction of the transparent substrate in the form of a disk; and*

*an optical unit for emitting a linearly polarized light as said light beam, wherein a plane of polarization of said linearly polarized light beam is set within ±5 degrees of a selected one of directions parallel, perpendicular and 45 degrees to the principal dielectric axis of the transparent substrate of the optical data recording medium.*

*20. An optical data recording system comprising:*

*an optical data recording medium including a transparent substrate that is rectangular and in the form of a card, whereby the recording medium is an optical data recording card, and a selected one of a recording film and a reflection film on one side of the transparent substrate for recording and/or reproducing data by radiating a linearly polarized light beam on said selected one of the recording film and the reflection film; wherein the rectangular transparent substrate has an outer peripheral longitudinal line; and wherein a given principal dielectric axis of the transparent substrate is set within ±3 degrees of at least a selected one of a direction parallel to the outer peripheral longitudinal line, a direction perpendicular to the direction parallel to the outer peripheral longitudinal line, and a direction 45 degrees to the direction parallel to the outer peripheral longitudinal line of the transparent substrate; and*

*an optical unit for emitting a linearly polarized light as said light beam, wherein a plane of polarization of said linearly polarized light beam is set within ±5 degrees of a selected one of directions parallel, perpendicular and 45 degrees to the principal dielectric axis of the transparent substrate of the optical data recording medium.*

*21. An optical data recording system comprising:*

*an optical data recording medium including a transparent substrate in the form of a disk, whereby the recording medium is an optical data recording disk, and a selected one of a recording film and a reflection film on one side of the transparent substrate for recording and/or reproducing data by radiating a linearly polarized light beam on said selected one of the recording film and the reflection film, a given principal dielectric axis of the transparent substrate being set within ±3 degrees of each of a radial direction and a circumferential direction of the transparent substrate in the form of a disk; and*

*an optical unit for emitting a linearly polarized light as said light beam, wherein a plane of polarization of said linearly polarized light beam is set within ±5 degrees of a selected one of directions parallel, perpendicular and 45 degrees to the principal dielectric axis of the transparent substrate of the optical data recording medium.*

*22. A method of producing an optical data recording medium, comprising a step of molding a transparent substrate by injecting a molten plastic material into a die cavity of an injecting die, the injecting die having an injecting gate, said die cavity having a die cavity surface, with a part of the cavity surface thereof being formed of a signal side of a stamper, wherein said injecting die is provided with said injecting gate connected to said cavity at a center of said cavity, in plan view, and a sprue is connected to said cavity; wherein a temperature distribution along the cavity surface around the sprue is not more than ±5° C.; and wherein a temperature $T_c$ of the cavity surface of said die is so adjusted that $T_g-80 \leqq T_c \leqq T_g$, where $T_g$ is a glass transition temperature of the plastic material.*

*23. A method of producing an optical data recording medium according to claim 22, wherein the temperature of said molten plastic material is so controlled that the viscosity of the molten plastic material injected from said injecting gate into said die cavity is less than 2000 poise.*

*24. A method of producing an optical data recording medium according to claim 22, wherein said injecting die includes a cold slug well, said injecting gate has a gate width of less than 1 mm, and an injection rate of the injecting the molten plastic material into said die cavity is so controlled such that the molten plastic material is injected at a first rate during a beginning period of an injection cycle, is injected at a second rate during an intermediate period of the injection cycle, and is injected at a third rate during an end period of the injection cycle, the first and third rates being lower than said second rate.*

*25. A method of producing an optical data recording medium according to claim 22, wherein the injecting gate of said injecting die has a gate width of less than 1 mm, and the injecting die includes a cold slug well, a capacity of the cold slug well being in the range of 1/7 to ½ of the capacity of the sprue.*

*26. A method of producing an optical data recording medium according to claim 22, wherein said injecting gate of said injecting die has a gate width of less than 1 mm, and a period of the injecting, from a start of injection of the molten plastic material into the die cavity to an end of injection of the molten plastic material into the die cavity, is within a range of 0.2–1 sec.*

*27. A method of producing an optical data recording medium according to claim 22, wherein the plastic material is a polycarbonate resin.*

*28. A method of producing an optical data recording medium, comprising a step of molding a transparent plastic substrate by injecting a molten plastic material into a die cavity of an injecting die, the infecting die having an injecting gate for injecting molten plastic material into the die cavity, the die cavity having a die cavity surface, the die cavity surface including a signal information recording pattern side of a stamper, wherein a temperature of said molten plastic material passing through said injecting gate is so controlled as to attain a viscosity of the molten plastic material of less than 2000 poise.*

*29. A method of producing an optical data recording medium, including a step of molding a transparent plastic substrate by injecting a molten plastic material into a die cavity of an injecting die, the injecting die having an injecting gate, said die cavity having a die cavity surface, with a part of the die cavity surface including a signal information recording pattern side of a stamper, the injecting gate being connected to the die cavity for injecting molten plastic material into the die cavity through the injecting gate, wherein the injecting gate has a gate width of less than 1 mm, said molten plastic material is injected into the cavity in 0.2–1 sec, and a principal dielectric axis of the transparent plastic substrate formed is aligned with a reference direction or perpendicular to said reference direction.*

*30. A method of producing an optical data recording medium according to claim 29, wherein said die includes a cold slug well and a sprue, a capacity of said cold slug well being in the range of 1/7 to 1/2 of the sprue.*

*31. A method of producing an optical data recording medium according to claim 29, wherein said injecting gate of said injecting die has a gate width between 0.1 mm and 0.6 mm; and wherein a temperature of the molten plastic material passing through the injecting gate is so controlled so as to provide a viscosity of the molten plastic material of 500 to 2000 poise.*

*32. A method of producing an optical data recording medium according to claim 29, wherein said molten plastic material is a polycarbonate resin.*

*33. A method of producing an optical data recording medium, comprising a step of molding a transparent substrate by injecting a molten plastic material into a die cavity of an injecting die, the injecting die having an injecting gate for injecting molten plastic material, into the die cavity, the die cavity having a die cavity surface, the die cavity surface having a part thereof formed by a signal side of a stamper, wherein said injecting die further includes a sprue connected to said injecting gate and provided at a center of the cavity surface, in plan view; wherein a temperature distribution along a circumference of the cavity surface, around the sprue, is not more than ±5° C.; and wherein a temperature $T_c$ of the cavity surface is so adjusted to satisfy the relation $T_g-80 \leqq T_c \leqq T_g$, where $T_g$ is a glass transition temperature of the plastic material.*

*34. An optical data recording medium having at least one layer, said at least one layer including a recording film or reflecting film, on a surface of a transparent substrate, said recording film or reflecting film being adapted to reproduce a recorded information by irradiating a linearly polarized light, as a data reading light, at said recording film or reflecting film, from the transparent substrate side of the medium; and wherein a shift of direction of the irradiating linearly polarized light, due to the transparent substrate, is β in formula (1),*

$$Sin4\beta \leq \frac{2\cos\delta \cdot \sin\theta_k}{1.8\sin^2\delta \cdot \cos\theta_k}, \qquad (1)$$

*where δ is a retardation by a single pass of said linearly polarized light, generated by birefringence of the transparent substrate, and $\theta_k$ (in degrees) is a magneto-optical rotational angle (Kerr rotational angle) of a reflected light from said recording film or reflecting film, obtained by irradiating the recording film or the reflecting film with the linearly polarized light.*

*35. An optical data recording medium according to claim 34, wherein said at least one layer includes at least an enhancement layer and a magneto-optical recording layer, said magneto-optical recording layer being said recording film.*

*36. An optical data recording medium, comprising at least one layer, said at least one layer including a recording film or reflecting film, on a surface of a transparent substrate, said recording medium being adapted to have a linearly polarized light irradiated thereon, from the transparent substrate side, for reproducing information, wherein a signal-to-noise ratio of a reproduced signal from said optical data recording medium becomes a local maximum when a plane of polarization of the linearly polarized light is selected in one of a direction parallel, perpendicular or 45° to a principal dielectric axis of the transparent substrate.*

*37. An optical data recording medium according to claim 36, said principal dielectric axis is a radial direction of the substrate.*

*38. An optical data recording medium according to claim 36, wherein said at least one layer includes at least an enhancement layer and a magneto-optical recording layer, said magneto-optical recording layer being said recording film.*

* * * * *

UNITED STATES PATENT AND TRADEMARK OFFICE

CERTIFICATE OF CORRECTION

PATENT NO. : Re. 37,719 E
DATED : May 28, 2002
INVENTOR(S) : Sugiyama et al.

It is certified that error appears in the above-identified patent and that said Letters Patent is hereby corrected as shown below:

Title page,
Between Item [76] and Item [21], please add:
-- [73] Hitachi Maxell, Ltd., Ibaraki, Japan --.

Signed and Sealed this

Twenty-sixth Day of August, 2003

JAMES E. ROGAN
*Director of the United States Patent and Trademark Office*